US008261033B1

(12) United States Patent
Slik et al.

(10) Patent No.: US 8,261,033 B1
(45) Date of Patent: Sep. 4, 2012

(54) TIME OPTIMIZED SECURE TRACEABLE MIGRATION OF MASSIVE QUANTITIES OF DATA IN A DISTRIBUTED STORAGE SYSTEM

(75) Inventors: David Slik, Burnaby (CA); Jay Austin, New Westminister (CA); Angela Cheng, Richmond (CA); Alvin Lam, Vancouver (CA); Markus Lampert, New Westminister (CA); Michael Montour, Vancouver (CA)

(73) Assignee: Bycast Inc., Vancouver (CA)

( * ) Notice: Subject to any disclaimer, the term of this patent is extended or adjusted under 35 U.S.C. 154(b) by 405 days.

(21) Appl. No.: 12/552,173

(22) Filed: Sep. 1, 2009

Related U.S. Application Data

(60) Provisional application No. 61/184,300, filed on Jun. 4, 2009.

(51) Int. Cl.
*G06F 12/02* (2006.01)
(52) U.S. Cl. ............... 711/162; 711/111; 711/E12.002
(58) Field of Classification Search ............... 711/162, 711/111
See application file for complete search history.

(56) References Cited

U.S. PATENT DOCUMENTS

| 4,562,534 | A | | 12/1985 | Zandveld et al. |
| 5,475,706 | A | | 12/1995 | Kobayashi et al. |
| 5,778,395 | A | * | 7/1998 | Whiting et al. ............... 1/1 |
| 5,806,075 | A | | 9/1998 | Jain et al. |
| 6,567,818 | B1 | | 5/2003 | Frey et al. |
| 6,779,082 | B2 | | 8/2004 | Burger et al. |
| 6,782,389 | B1 | | 8/2004 | Chrin et al. |
| 6,832,227 | B2 | | 12/2004 | Seki et al. |
| 6,898,589 | B2 | | 5/2005 | Erdmenger et al. |
| 7,000,141 | B1 | | 2/2006 | Karlsson et al. |
| 7,027,463 | B2 | | 4/2006 | Mathew et al. |
| 7,299,250 | B2 | | 11/2007 | Douceur et al. |
| 7,343,459 | B2 | | 3/2008 | Prahlad et al. |
| 7,376,764 | B1 | | 5/2008 | Todd |
| 7,392,261 | B2 | | 6/2008 | Clark et al. |
| 7,505,586 | B2 | | 3/2009 | Schmidt |
| 7,546,486 | B2 | | 6/2009 | Slik et al. |
| 7,577,724 | B1 | | 8/2009 | Jalagam et al. |
| 7,590,672 | B2 | | 9/2009 | Slik et al. |
| 7,664,794 | B2 | | 2/2010 | Kasmirsky et al. |
| 7,885,936 | B2 | | 2/2011 | Austin et al. |
| 7,904,570 | B1 | | 3/2011 | Kroupa |

(Continued)

OTHER PUBLICATIONS

"The Hidden Costs of Data Migration," IBM Global Technology Services, Dec. 2007, pp. 1-12 (GTW01279-USEN-01).

(Continued)

*Primary Examiner* — Kenneth Lo
(74) *Attorney, Agent, or Firm* — Knobbe, Martens, Olson & Bear, LLP

(57) ABSTRACT

A method and system for migrating massive amounts of data in a secure and traceable fashion using a distributed storage system is described. Data shuttle storage devices moves large quantities of content from one source location to one or more target locations by first acting in local communication with the source location, then being physically moved to a location where a shuttle storage device may be in local communication with the target location. This migration does not compromise data accessibility, reliability, or security. Dynamic configurable policy-driven data placement specifies the number and location of multiple copies of each digital data object. Each digital data object replica remains traceable even as the hardware onto which it is stored is being relocated. The content remains accessible at any time.

31 Claims, 10 Drawing Sheets

U.S. PATENT DOCUMENTS

| | | |
|---|---|---|
| 2002/0035638 A1 | 3/2002 | Gendron et al. |
| 2002/0133515 A1 | 9/2002 | Kagle et al. |
| 2003/0040854 A1* | 2/2003 | Rendahl et al. ............ 701/29 |
| 2003/0149709 A1 | 8/2003 | Banks |
| 2004/0139222 A1 | 7/2004 | Slik et al. |
| 2004/0153739 A1* | 8/2004 | Trimmer et al. ............ 714/7 |
| 2004/0199566 A1 | 10/2004 | Carlson et al. |
| 2004/0243997 A1* | 12/2004 | Mullen et al. ............ 717/174 |
| 2005/0010529 A1 | 1/2005 | Zalewski et al. |
| 2005/0021566 A1 | 1/2005 | Mu |
| 2005/0195660 A1 | 9/2005 | Kavuri et al. |
| 2005/0246311 A1 | 11/2005 | Whelan et al. |
| 2006/0004820 A1 | 1/2006 | Claudatos et al. |
| 2006/0010169 A1* | 1/2006 | Kitamura ............ 707/200 |
| 2006/0026219 A1 | 2/2006 | Orenstein et al. |
| 2006/0136691 A1* | 6/2006 | Brown et al. ............ 711/165 |
| 2006/0190358 A1 | 8/2006 | Slik |
| 2007/0094316 A1 | 4/2007 | Rodriguez et al. |
| 2008/0235247 A1 | 9/2008 | Krantz et al. |
| 2008/0270698 A1* | 10/2008 | Shirogane et al. ............ 711/114 |
| 2009/0030953 A1 | 1/2009 | Fukuda et al. |
| 2009/0089340 A1 | 4/2009 | Ohr et al. |
| 2009/0216796 A1 | 8/2009 | Slik et al. |

OTHER PUBLICATIONS

Lu, Chenyang, Alvarez, Guillermo A. and Wilkes, John, "Aqueduct: Online Data Migration With Performance Guarantees," Proceedings of the FAST 2002 Conference on File and Storage Technologies (FAST '02), pp. 219-230, Jan. 28-30, 2002, Monterey, CA (USENIX, Berkeley, CA).

Howard, Philip, "Data Migration," A White Paper by Bloor Research, publication date Oct. 2007, pp. 1-15.

U.S. Appl. No. 12/356,049, filed Jan. 19, 2009 (filing receipt, application text and drawings provided); please treat as prior art for examination purposes.

International Search Report and Written Opinion of patent application No. PCT/IB2007/004580 dated Dec. 4, 2008—12 pages.

International Search Report and Written Opinion of patent application No. PCT/IB2007/004346 dated Sep. 9, 2008—11 pages.

Chu, et al., *The Exclusive-Writer Protocol: A Low Cost Approach for Updating Replicated Files in Distributed Real Time Systems*, Proc. 3$^{rd}$ Int. Conf. Distrib. Comput. Syst., Oct. 1982, pp. 219-220.

Manivannan, et al., *A Decentralized token Generation Scheme for Token-Based Mutual Exclusion Algorithms*, International Journal of Computer Systems Science and Engineering, 11(1):45-54, Jan. 1996.

McCue and Little, *Computing Replica Placement in Distributed Systems*, Computing Laboratory, University of Newcastle Upon Tyne, *IEEE Second Workshop on Replicated Data*, Monterey, pp. 58-61, Nov. 1992.

Milenkovic, *Update Synchronization in Multi-access Systems*, Distributed Database Systems, No. 8, 1979, pp. 2-3, 8-11, 32-35.

Slik, et al., *Scalable Fault Tolerant Image Communication and Storage Grid*, SPIE USE, vol. 2, pp. 5033-5037, Jan. 17, 2003.

Lübeck, et al.; "An Overview of a Large-Scale Data Migration"; Database Group, IT Division; European Organization for Nuclear Research (CERN); Jan. 17, 2003.

Storage Area Network, "Maximizing Efficiency in Block-Level Data Migration," Brocade Communications Systems, Inc., San White Paper, Apr. 2007, pp. 1-9, (04/07 GA-WP-861-00).

Nirvanix Datasheet, 2 page document, (NDS-INGESTIONSERVICES-1108); Nov. 5, 2008.

Introduction to iRods, www.irods.org (Sep. 2007).

ISO/IEC 11578; Information Technology—Open Systems Interconnection—Remote Procedure Call; RPCI pp. 533-538 (1996).

SureSync Evaluators Guide, Software Pursuits, Inc. (2006).

Chervenak, et al.; "Data Placement for Scientific Applications in Distributed Environments"; USC Information Science Institute, Marina Del Rey, CA, Computer Science Department, University of Wisconsin Madison, Madison, WI. (Sep. 2007).

Chervenak, et al.; "A Data Placement Service for Petascale Applications"; USC Information Sciences Institute, Marina Del Rey, CA (2007).

Cooper et al.; ""Implementing a Reliable Digital Object Archive""; Department of Computer Science, Stanford University. (Jun. 2000).

Little, et al.; "The Replica Management System: a Scheme for Flexible and Dynamic Replication"; Department of Computing Science, University of Newcastle upon Tyne, Newcastle upon Tyne, UK, and Xerox Corporation, Webster, NY. (Mar. 1994).

Ma, et al.; "Web-Based Monitoring and Management System for Integrated Enterprise Wide Imaging Networks", Medical Imaging:PACS and Integrated Medical Information Systems: Design and Evaluatiuon; SPIE vol. 5033; pp. 160-171; Feb. 2003.

Lo, Sai-Lai; A Modular and Extensible Network Storage Architecture; Cambridge University Press; pp. 51, 53-54; Sep. 1995.

Terry, et al.; "The Case for Non-transparent Replication: Examples from Bayou"; Computer ScienceLaboratory, Xerox Palo Alto Research Center, Palo Alto, CA. (1998).

Alspaugh, et al.; "Data Management for Distributed Scientific Collaborations Using a Rule Engine" Department of Computer Science, University of Virginia, Information Sciences Institute,University of Southern California; Sep. 2008.

"Lecture Notes in Computer Science"; Springer Study Edition; vol. 105; 1981.

Elson; et al.; "Random, Ephemeral Transaction Identifiers in Dynamic Sensor Networks", Department of Computer Science; University of California, Los Angeles; 2001.

Herman, Daniel; "Towards a Systematic Approach to Implement Distributed Control of Synchronization"; Distributed Computing Systems; pp. 50-51, 54-55; 1983.

Ko, et al.; "Distributed, Self-Stabilizing Placement of Replicated Resources in Emerging Networks"; Department of Electrical Engineering, Columbia University, New York, NY.; 2003.

Lippman; "Asymmetric Coding of Motion Picture Sequences"; MIT Media Lab, Jun. 1998.

Moore et al.; "Policy Core Information Model—Version 1 Specification"; The Internet Society; 2001.

Sollins, et al; RFC 1737 Functional Requirement's for Uniform Resource Names; Dec. 1994.

Slik, et al.; "A Comprehensive Security Framework for the Communication and Storage of Medical Images", Medical Imaging:PACS and Integrated Medical Information Systems: Design and Evaluatiuon; SPIE vol. 5033; pp. 212-223; 2003.

* cited by examiner

TIME OPTIMIZED SECURE TRACEABLE MIGRATION OF MASSIVE QUANTITIES OF DATA IN A DISTRIBUTED STORAGE SYSTEM

RELATED APPLICATIONS

This application is related to, and claims the benefit of U.S. Provisional 61/184,300 filed Jun. 4, 2009, the entirety of which is hereby incorporated by reference herein and made a part of the present specification.

TECHNICAL FIELD

The present invention relates to distributed storage systems. In particular, the present invention relates to migrating data in a distributed storage system.

BACKGROUND

Data migration is the process of moving data from one location to another. As computing systems increase in scale and reach, the requirement to be able to reliably access stored data from multiple locations and at high rates has increased in importance. The costs associated with hardware to store the content, infrastructure and labor for managing backups, and then the potential downtime and effort to recover from hardware failures rise quickly as the size of the stored data increase and the time duration for maintaining the data extends from years to decades.

SUMMARY

Organizations are storing ever increasing quantities of historical data for several years or decades. Government regulation has only increased the need for more and more organizations, including those in the health care and financial sectors, to experience significant increases in the amount of electronic data produced that must be maintained and preserved. Data migration may also be required for other reasons, including storage consolidation, data center relocation, system expansion, hardware refresh in which old hardware is replaced with new hardware, load balancing, failure recovery, organizational changes such as mergers and acquisitions, the introduction of new applications, business processes changes, and other compliance requirements.

The issue facing many organizations is the sheer bulk of the data currently sitting on storage medium within their own facilities. Migrating the data to and from off site storage via traditional means is often too costly in terms of both money and time to complete. For example, off site storage is generally not in local communication with an organization's storage facilities. Bandwidth limitations and costs over non-local communication medium, such as the internet, may be cost and time prohibitive for migrating massive quantities of data. Physically moving storage off site or migrating the data introduces issues such as lack of data availability during migration, possible loss of data or corruption of data, and lack of accountability or tracking the data.

A system for time optimized secure traceable migration of massive quantities of data in a distributed storage system is needed to address the issues typically associated with the migration of bulk quantities of data. These challenges include data preservation so that no data is lost as a result of migration, enabling the recovery of corrupted data, allowing access to data during migration to prevent downtime and maintain application performance, allowing data tracing so that its location can be determined at any point in time, documenting data provenance and chain of custody, providing fault resilience, securing data during migration via encryption to protect against unauthorized access, optimizing storage of migrated data through compression, and providing maximum interoperability with existing data storage systems independent of storage vendors at source and destination locations. In meeting these challenges a system and method for such migration should be highly scalable, cost-effective based on organizations' resources and skills, and require minimum manual labor as such human involvement tends to be costly and error-prone. A method for migrating data using such a system is an important part of meeting organizations' technical needs.

Distributed storage systems grow as new objects are stored. This growth is accelerated by providing redundant copies of stored objects in order to reduce the probability of data loss. As the size and complexity of a distributed storage system grows, the resources necessary to manage the storage system also increase. Improved data management techniques are therefore needed as the system scales to more efficiently store, organize, and manage data in a distributed storage system, while also fulfilling applicable regulations and business needs. Various events, such as system growth, relocation, back-up, or routine multi-site duplication may require copying large quantities of objects from a source location to one or more target locations. Cost, time, reliability, availability and verifiability are all considerations in determining how best to perform this data movement.

In one embodiment, the distributed storage system may store only fixed-content objects, resulting in a fixed-content storage system. In this system, digital data objects are received at a source location and stored according to information lifecycle management (ILM) policies. These policies may specify that multiple copies of particular objects are to be stored at both the source location and an off-site target location, such as a data centers. A shuttle storage device, for example a server computer, is placed in local communication with the source location. For example, such local communication can occur by over a local area network. The shuttle storage device's location is registered with a control system which, recognizing the need for objects at that location to be migrated to other locations, and recognizing the shuttle storage device's presence as a means for fulfilling this requirement, causes the objects to be duplicated via the local communication onto the shuttle storage device. The shuttle storage device is then physically moved to a location where it can be in local communication with the target location. For example, the server may be mailed with some form of package tracking, sent by secure, traceable courier, or personally transported by an employee. Upon its arrival, the shuttle storage device is registered with the control system as being in local communication with the target location.

In another embodiment, multiple shuttle storage devices are used in order to migrate the objects from the source location to multiple target locations. For example, this multi-target migration may occur in parallel, so that multiple shuttle storage devices are all in local communication at the source location at the same time, receiving the duplicated copies of the objects. The shuttle storage devices are then physically transported to their target locations and each shuttle storage device is registered as being in local communication with its respective target location once that local communication is accomplished.

In another embodiment, a group of multiple shuttle storage devices are in local communication with the source location, and the network of the source location is configured such that, for each object ingested into the system at the source location, a duplicate copy is made on each of the shuttle storage devices in the group. Each shuttle storage device has a unique identifier used by the control system. In this way, the actual infrastructure of the source location ensures that duplicate copies are properly and reliably created, using the information lifecycle management policies to enforce duplication. A shuttle storage device may leave the source location at any time, but typically leave once they are full. Alternatively, the shuttle storage device may leave the source location after all objects to be transported have been ingested into the storage system at the source location. In this embodiment, shuttle storage devices are set to read-only mode once full or once all ingestion has occurred. In an alternate embodiment, they need not be set to read-only mode. Once the shuttle storage modes are to be moved from the source location, such migration may occur, in a series rather than in parallel. For example, the first shuttle storage is completely moved to its target location before the second shuttle storage node is removed from communication at the source location and moved to its target location. This increases reliability because at least two copies of the migrated objects are accessible through the distributed content system at all times. While the first shuttle storage device is in transit, the objects are accessible from the second and third shuttle storage devices at the source location. While the second shuttle storage device is in transit, the objects are accessible from the first shuttle storage device at its target location, and the third shuttle storage device at the source location.

In another embodiment to achieve such infrastructure-level based duplication, a system bus, rather than a network, guarantees duplication to the shuttle storage devices, for example using hard-disk or solid-state based storage configured in a RAID array.

DETAILED DESCRIPTION

Storage Grid Overview

Figure 1:
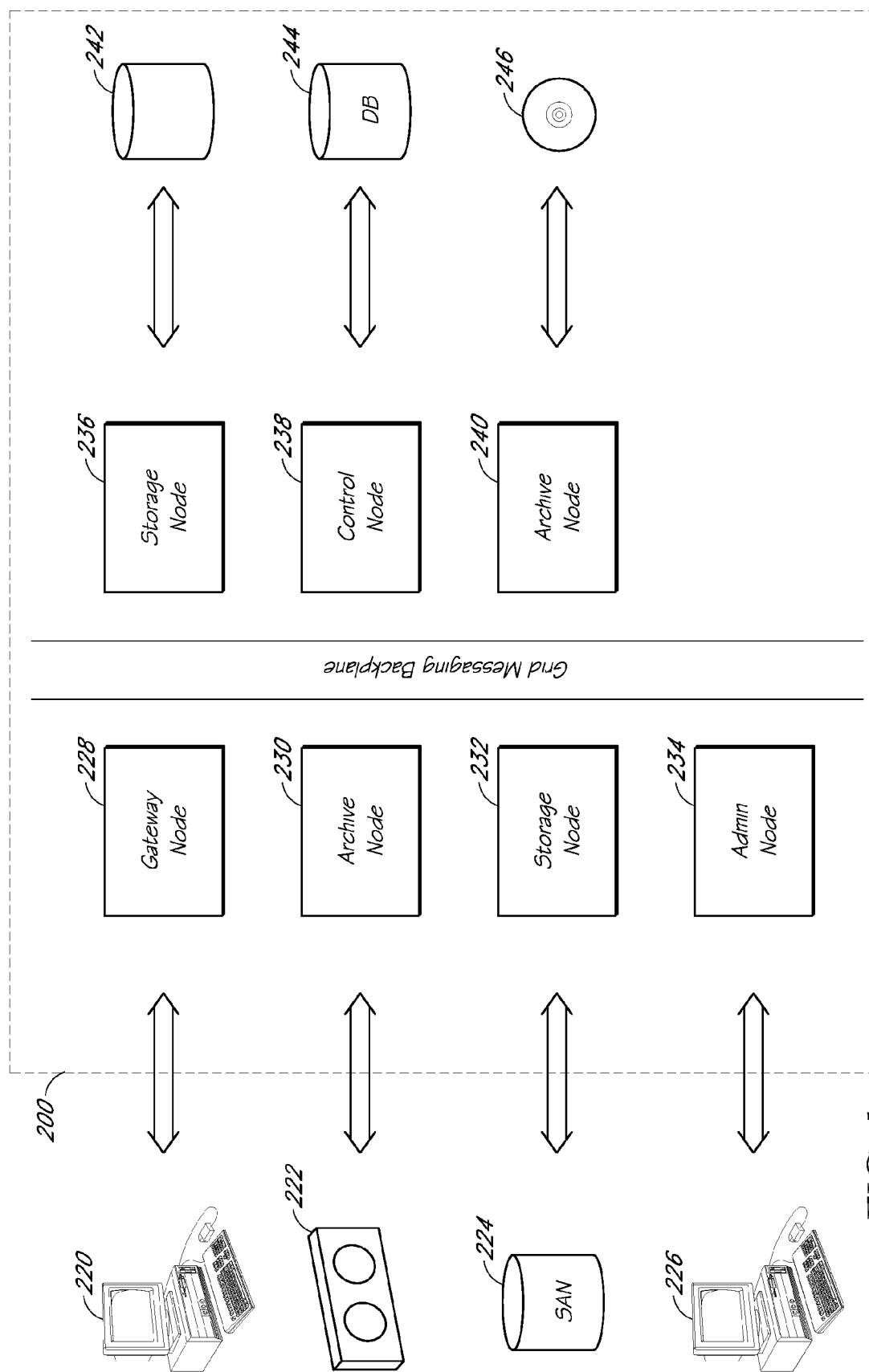
FIG. 1 illustrates a high level block diagram selected components of a distributed fixed-content storage system.

Migration and replication of digital data objects may occur in the context of a distributed storage network. In one embodiment, the distributed storage network is a storage grid of fixed-content objects. A typical fixed-content storage system deployment may involve multiple nodes, often spanning multiple geographically separated sites. When a request for information is made, the storage grid 200 may serve that request based on the location of the data, the location of the user, the load on the system, the state of the network and other factors. This balances the load on the network, storage and servers in order to minimize bandwidth usage and increase performance. The storage grid 200 is a unified structure, but there may be multiple servers or repositories of content or metadata.

Nodes may be grouped based on the services they provide. For example, storage nodes 232, 236 may provide for secure data storage and transmission. A storage node may consist of a service running on a computing resource that manages storage and archival media such as a spinning media resource or tape.

The storage resource 224, 242 on a storage node can be based on any storage technology, such as RAID, NAS, SAN, or JBOD. Furthermore, this resource may be based on any grade of disk such as a high performance fiber channel or ATA disk. Storage nodes may be linked together over, for example, LAN and WAN network links of differing bandwidth.

Storage nodes can accept data and process retrieval requests, and information input into a storage node can be retrieved from other storage nodes. Storage nodes may process client protocol requests and include support for DICOM, HTTP and RTP/RTSP. Support for NFS/CIFS may be provided, for example, through gateway nodes.

Storage nodes may replicate and cache data across multiple sites and multiple nodes. Data replication is based on a set of configurable rules that are applied to the object metadata and may take into account geographic separation of nodes as well as the bandwidth and topology between nodes. The logic that governs replication and distribution may be enforced by control nodes.

Gateway nodes 228 provide an interface through which external applications 220 may communicate with the storage grid. Gateway nodes 228 route incoming requests to storage nodes based on, for example, the available CPU, bandwidth, storage and geographic proximately. For applications that require direct file system access, the gateway nodes 228 may provide a NFS/CIFS interface to the storage grid.

Control nodes 238 may consist of separate software services, such as the Content Metadata Service (CMS) and the Administrative Domain Controller (ADC). Although these services can run on separate computing resources, they may also share a single server. The Content Metadata Service constitutes a distributed business rules engine that provides for content metadata storage, metadata synchronization, metadata query and enforcement of replication and information lifecycle management business logic. Replication and information lifecycle management policies may be based on metadata that is associated with stored objects. This allows the creation of business rules that determine where content and metadata is stored, how many copies are stored, and on what media it is stored on throughout its lifecycle. A Content Metadata Service may interface, for example, with a local SQL database through a database abstraction layer.

The Administrative Domain Controller acts as a trusted authentication repository for node-to-node communication. It also provides knowledge of system topology and information to optimize real-time usage of bandwidth, CPU and storage resources. This allows automated management of computational resources and dynamic load balancing of requests based on the available CPU, storage and bandwidth resources. Knowledge of system topology may be presented using a graphical user interface which displays physical locations in tree form, and further displays storage nodes as objects associated with those physical locations.

The Administration Node 234 may consist of software components such as the Network Management Service and the Audit Service. These services may share a common computing resource, or they may be run on separate computing resources. A management interface 226 may be used to monitor and manage the operational status of the grid and associated services.

The Audit Service provides for the secure and reliable delivery and storage of audited events corresponding to content transactions across the entire storage grid. Audit events are generated, in real-time, by Storage Nodes and Control Nodes. Events are then relayed through the storage grid using a reliable transport mechanism and delivered to the Administration Nodes. Audit messages are processed by the Audit Service and may be directed to an external database or file.

The Network Management Service collects and processes real-time metrics on utilization of computing, storage and bandwidth resources. It provides real-time and historical usage reports. In addition it is responsible for fault reporting and configuration management.

The Archive Node 230, 240 may manage a locally attached tape drive or library 246 for the archiving and retrieval of grid managed objects. Archive nodes may be added to diversify archive pools and to provide archival storage at multiple sites. The storage grid 200 may also utilize external storage resources, such as a managed tape library 222 or an enterprise SAN 224.

Storage Nodes and Control Nodes in the storage grid can be upgraded, decommissioned, replaced or temporarily disconnected without any disruption. Nodes do not need to run on the same hardware or have the same storage capacity. Nodes replicate and cache data across multiple sites and multiple nodes. In addition to bandwidth savings, the intelligent distribution of information provides for real-time backup, automated disaster recovery and increased reliability.

Capacity, performance and geographic footprint of the storage grid can be increased by adding nodes as needed, when needed, without impacting end-users. This enables the storage grid to accommodate thousands of terabytes of data across hundreds of locations. The storage grid combines the power of multiple computers to achieve extremely high levels of scalability and throughput. As nodes are added to the storage grid, they contribute to the available computational and storage resources. These resources are seamlessly utilized based on bandwidth availability and geographical suitability.

In traditional archives, information is stored as files, and access to data is gained through a path pointer stored in an external database. When storage scales, old storage is replaced, or is offline, this results in broken pointers and unavailable data. In order to scale, costly and disruptive migration procedures are required. Furthermore, it is difficult to operate in heterogeneous environments and multi-site deployments. This is because the approach relies on the underlying file system and network file system protocols.

Within the storage grid, data are stored and referenced as objects. An object can be one file or a collection of files with relationships that are defined by object metadata. Object metadata constitutes application specific information that is associated with a data object. This information can be attached to or extracted from the object at the time of input into the storage grid. Object metadata can be queried and the storage grid can enforce business rules based on this information. This allows for efficient utilization of storage/bandwidth resources, and enforcement of storage management policies.

In this object oriented architecture, external applications no longer use pointers to a path, but a universal handle to an object. This enables high levels of reliability, scalability and efficient data management without the need for disruptive migration processes. Multiple object classes can be defined and for each object class, there are specific business rules that determine the storage management strategy.

In this embodiment, the storage grid is fault tolerant, resilient and self-healing. Transactions continue to be processed even after multiple hardware, storage and network failures. The design philosophy is that hardware, network, and catastrophic failures will occur, and the system should be able to deal with faults in an automated manner without impacting the stored data or end-users.

Reliability is achieved through replicas, which are identical copies of objects (both data and metadata) that are stored on multiple nodes and kept synchronized. Increasing reliability involves adding nodes to the storage grid and increasing the number of replicas for each object. The location and number of the replicas is based on a set of rules that can be configured to ensure geographical separation and the desired level of redundancy. The storage grid will automatically enforce this logic across all nodes. If a failure is detected, the system is self-healing in that additional replicas are automatically created to restore the level of resiliency.

As nodes are added, removed or replaced, the system manages the available storage. Incoming data is transparently re-directed to the take advantage of the newly added storage capacity. Within the storage grid objects are redistributed, purged, or replicated based on metadata and policies that are applied to the metadata. Objects can also migrate from one storage grade (e.g., disk) to another (e.g., tape) not simply based on time and date stamps, but external metadata that indicates the importance of the object to the specific business application. For example in medical applications, certain imaging exams may be immediately committed to deep storage. In applications for the financial sector, retention policies may be set up to facilitate compliance with regulatory requirements for data retention.

Users may input and retrieve data from the location within the storage grid that is closest to them, thereby efficiently utilizing bandwidth and reducing latency. In addition, as information is requested, it may be cached at the requesting Storage Node to enable improved bandwidth efficiency.

Obsolete components can be removed without impacting services or endangering stability and reliability. A Storage Node may be decommissioned through the administrative console. When this takes place, the storage grid may automatically redirect requests to alternate nodes. Furthermore, the storage grid may transparently re-distribute the stored data on other suitable Storage Nodes. This allows for seamless removal of obsolete hardware without any disruptions to storage grid operations. This is in contrast to disruptive data migration procedures that are common in many fixed content applications. Operators can eliminate support for obsolete hardware while taking advantage of the economic benefits of decreasing costs of storage and increases in processing power. Each newly added node costs less and provides more processing power and storage capacity.

When data and metadata are stored into the storage grid, the data and metadata is packaged into an object. Objects consist of data and associated metadata that are managed as an unalterable and atomic entity. Once stored, these objects are actively managed throughout their information lifecycle. When an object is retrieved, the original data and associated metadata is presented for use. This provides a transparent storage service to external entities.

Each object stored may have a unique identifier that acts as the primary identifier for the object. This identifier may be assigned at the time the object is created. Objects can be moved from one object store to another.

Objects stored within the grid may contain metadata, which is used to manage the objects over their lifecycle and facilitate access to the objects. Object metadata may include, for example, Content Block metadata, Protocol metadata, Content metadata, User metadata, or Management metadata.

Content Block metadata may be metadata associated with the object creation process itself, and provides information about the packaging and protection of the user provided data and metadata. An example of this type of metadata is the size of the data stored in a given object.

Protocol metadata may be metadata associated with the protocol used to store the object, but not intrinsic to the data within the object. This includes metadata required to perform protocol specific transactions. For data stored through the DICOM protocol, an example of this type of metadata is the DICOM AE title of the entity that stored the data.

Content metadata may include metadata contained within recognized types of content. If so processed, metadata specific to each recognized type of content is extracted from the content. For content of type PDF, an example of this type of metadata is the number of pages in a document.

User metadata may include arbitrary metadata specified by the entity storing content into the grid. This ability to attach user metadata is limited by the protocol used to store the objects. An example of this type of metadata is a private identifier assigned by the user.

Management metadata consists of metadata generated and modified over time as objects are managed within the grid. Unlike the previous four classes of metadata, this metadata is not immutable, and is not present as part of the object itself. An example of this type of metadata is the time when an object was last accessed.

Each time a new object is stored, the metadata associated with the object is also stored in a separate subsystem that maintains a repository of metadata. The metadata store can be queried to return the metadata associated with a given object. Queries can also be performed to return a list of objects and requested metadata for all objects that have metadata that matches a specific query.

Placement of objects may be based on the capabilities of the storage grid computing resources. Different computing resources have different capacity to perform work. While this is primarily measured based on the clock frequency of the processor, the number of processors and relative efficiencies of different processor families may also be taken into account. In addition, the amount of CPU resources that are currently in use provides a mechanism to determine how "busy" a given resource is. These characteristics are monitored and measured to allow decisions to be made within the grid about which computing resource is best suited to use to perform a given task.

Placement of objects may also be based on the characteristics of the storage resources, such as storage latency, reliability, and cost. Storage capacity provides information for calculating risk in the event of rebuild. A measurement of the amount of storage capacity that is currently in use provides a mechanism to determine how full a given storage resource is, and determine which locations are more able to handle the storage or migration of new content. Different storage resources have different throughput. For example, high performance Fiber-Channel RAID systems will deliver better performance then a lower performance software RAID on IDE drives. A measurement of the amount of I/O bandwidth that is currently in use provides a mechanism to determine the extent to which a given storage resource is able to handle additional transactions, and how much it will slow down current transactions. Storage resources can be read-only, and thus not a candidate for the storage of new objects. These characteristics may be monitored and measured to allow decisions to be made within the grid about which storage resource is best suited to use to retain objects over time, and influence the rules that determine where objects should be stored.

Placement of objects may also consider the characteristics of network paths, such as latency, reliability and cost. Different network paths have different amounts of bandwidth available. This directly maps into the time required to transfer objects from one storage repository to another. The amount of the network bandwidth that is currently in use may also be considered. This provides a mechanism to determine how "busy" a given network link is, and to compare the expected performance as compared to the theoretical performance. These characteristics may be monitored and measured to allow decisions to be made within the grid about which network path is best suited to use to transfer objects through the grid.

When objects are stored in multiple different locations, the probability of data loss is reduced. By taking common-mode failure relationships and fault probability information into account, the probability of data loss and data inaccessibility for a given placement of objects can be quantified and reduced to manageable levels based on the value of the data in question.

To avoid common mode failures, replicas of objects can be placed in separate failure zones. For example, two replicas created within a single server room can take into account that storage on nodes that do not share a single UPS has a higher probability of accessibility then two replicas stored on two nodes that share the same UPS. On a larger scale, two replicas created in geographically distant locations have a lower probability of loss then two nodes within the same facility.

As replica placement rules are metadata driven, they can be influenced by external systems and can change over time. Changes to existing replicas and changes to the topology of the grid can also influence replica placement rules.

Replica placement can reflect the instantaneous, historical and predictive information associated with a given resource. For example, monitoring of server and storage health can dynamically influence the degree of reliability attributed to a given resource. Different types of storage resources, such as IDE vs. SCSI, have different reliability characteristics. In addition, archival and offline storage often have a distinct media lifetime, which need to be managed to preserve archive integrity. These are both examples of the use of information about available resources is used to determine the best solution for a given set of constraints.

Implementation of configuration information based on formal risk analysis can further optimize the resource tradeoff by providing information about common mode failures that cannot be automatically discovered by the grid. For example, the placement of two replicas on nodes situated along the same fault line may be considered to be within a common failure mode, and thus suboptimal when compared to the placement of one of the replica in a facility not located on the fault.

The use of external data feeds can provide valuable information about changes in the reliability of a given failure zone. In one scenario, a live feed from the weather monitoring system can provide advance notice of extreme weather events, which could allow the grid to dynamically rebalance content to reduce the risks associated with the loss of connectivity to a given facility.

Content stored in a fixed-content storage system can be, but is not limited to, audio, video, data, graphics, text and multimedia information. The content is preferably transmitted via a distribution system which can be a communications network including, but not limited to, direct network connections, server-based environments, telephone networks, the Internet, intranets, local area networks (LAN), wide area networks (WAN), the WWW or other webs, transfers of content via storage devices, coaxial cable, power distribution lines (e.g., either residential or commercial power lines), fiber optics, among other paths (e.g., physical paths and wireless paths). For example, content can be sent via satellite or other wireless path, as well as wireline communications networks, or on the same path as a unit of power provided by a utility company.

Migration and replication may also occur in the context of a non-fixed, or dynamic-content distributed storage system. In such a system, modifications made to a digital data object at one location may need to be propagated to duplicate copies of the digital data object, some of which may exist at other locations. Depending on the data size of such digital modifications, they may be propagated either by electronic methods such as network or bus communications, or they may be propagated through physical data migration.

Migration Overview

Data is preserved for a variety of reasons. For example, corporate assets such as intellectual property, trade secrets, customer lists and financial information likely have enduring value to the enterprise. Digital records may need to be maintained for compliance with industry regulations for information retention or accessibility. The data may be preserved in compliance with business processes to ensure availability and security of primary corporate information in accordance with business policies and processes such as IT data retention policies, quality management systems and enterprise workflows.

Given that there are a variety of reasons for preserving data, there may be a need to move data from one location to another location. For example, the hardware that stores the data may need to be updated. Older server or storage hardware may need to be replaced with new hardware. Data from multiple locations may need to be consolidated, or there may be a data center relocation. Data may need to be moved to facilitate expansion of a data storage system. Data may be moved for load balancing purposes. If there is a failure in the system, data may be moved as part of the failure recovery process. Organizations going through mergers or acquisitions may have a need to relocate data. New applications may result in a need for movement of data. Changes in business processes may cause movement of data. Changes in the value of the data may require additional replicas to be made in remote locations. Data security and compliance requirements may also cause data to be moved.

However, non-disruptive data migration is a complex IT challenge. It is important that there is no loss of data and there should be an ability to recover from data corruption. During migration, data may still need to be accessible. The migration may be made transparent to users to maintaining application availability and prevent downtime or loss of application performance or network performance. Data may be traced during migration, providing knowledge of where the data is at any point in time, and documentation of the provenance and the chain of custody. The migration should be reliable and fault resilient. Security of the data in migration may be enhanced with, for example, data encryption or protection against unauthorized access. The migration may involve storage optimization via data compression. The migration process may need to take into account the ability to interoperability with existing data storage systems, such as technical compatibility issues, support for heterogeneous systems, and storage vendor independence. Some situations may call for scalability to allow for increasing storage capacity. The cost of migration will need to fit budget constraints and time constraints, and availability of resources and skills within the organization may be considered. Automation of the migration process may assist in minimizing errors.

Data can migrated be in various ways, such as physically or electronically, manually or automatically. Exemplary data migration tools include host-based, array-based, application-based, and appliance-based systems. In a host-based system, an operating system provide basic tools to copy data from one location to another. In an array-based system, the application servers are bypassed and a storage array controller migrates the data. In an application based system, the applications have copy functions for migration. In an appliance-based system, an appliance is placed between a host and a storage array. The appliance then migrates data to another location.

A data migration exercise may range from a few terabytes (TB) up to hundreds of terabytes or even petabytes (PB) of data. One TB is defined as 1,000,000,000,000 or $10^{12}$ bytes, that is, one thousand gigabytes. One petabyte is defined as 1,000,000,000,000,000 or $10^{15}$ bytes, that is, one thousand terabytes. Migrating large amounts of data over a WAN such as the internet may not be desirable because of the high cost of setting up or leasing lines, limited data transfer rates, and complicated infrastructure needed to deploy for possibly a single use.

Figure 2:
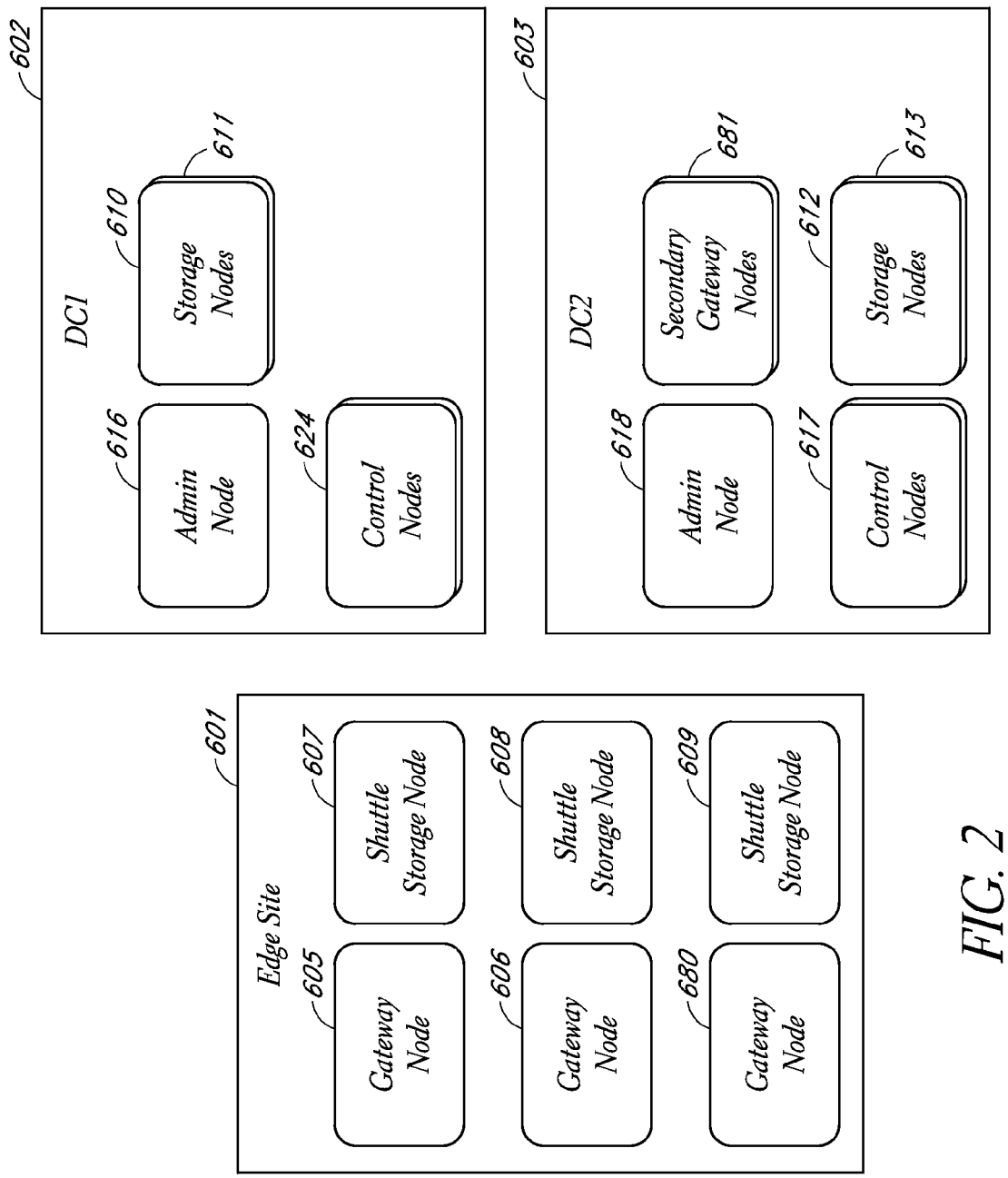
FIG. 2 illustrates a grid topology for migration of data from an edge site to a data center.

FIG. 2 illustrates an example of a grid topology that facilitates data migration by physically moving a data storage device from one location, such as an edge site 601 to one or more other locations, such as data centers 602, 603. For simplicity, FIG. 2 illustrates a single edge site 601 in the storage grid. The storage grid may have one or more edge sites and/or one or more data centers. A Wide Area Network (WAN), such as the public internet or a Private Wide Area Network (PWAN), may connect nodes on the grid such as edge site 30 with the data centers 10, 20.

Data may be submitted to the grid via a process known as ingest. The grid then reliably stores the ingested object, checks the integrity of the stored object, replicates the stored object, protects the object against failures, and makes the object accessible and traceable. Data ingested at edge site 30 may be replicated to data centers 10, 20 over a WAN. For large amounts of data, however, use of a WAN may not be feasible.

As part of the data migration process, copies of an ingested object may be stored onto one or more portable data storage devices 607, 608, 609 to facilitate migrating the data from one location to another. The portable data storage devices 607, 608, 609 may be physically located at the ingest site. Information lifecycle management policies uniquely identify the data storage devices 607, 608, 609 from other storage locations on the storage grid 200, and place copies of the ingested object on the portable data storage devices 607, 608, 609 subject to the grid management procedures for data reliability, integrity, accessibility and traceability purposes. When the portable data storage devices 607, 608, 609 have copies of all of the designated objects or the portable data storage devices 607, 608, 609 are approaching capacity, they may then be prepared for migration to one or more locations.

Figure 3A:
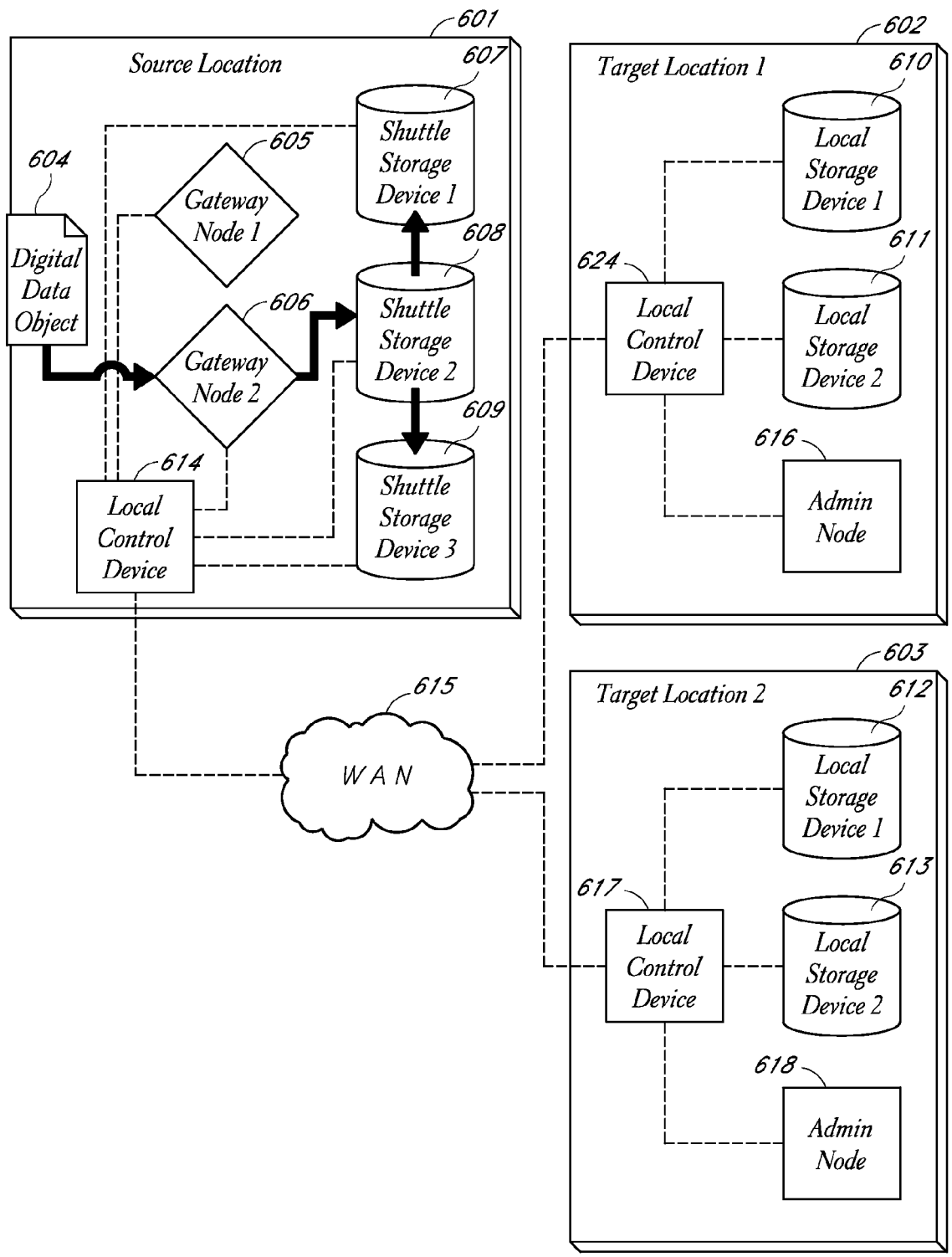
FIGS. 3A-E illustrate high level block diagrams of data migration from a source location to two target locations.

FIG. 3A illustrates an example of ingestion of digital data objects in a grid at a source location 601 for migration to one or more target locations 602, 603. Shuttle storage devices 607, 608, 609 are deployed at the source location 601. A grid management module is used to add the shuttle storage devices 607, 608, 609 to the grid topology and associate them with the source location 601. The shuttle storage devices 607, 608, 609 may initially be deployed in a read-only mode. Information lifecycle management policies are then updated to indicate the shuttle storage devices 607, 608, 609 are available for storage, and appropriate information lifecycle management policies and storage policies are configured to duplicate digital data objects to the shuttle storage devices 607, 608, 609. For example, an information life cycle management policy may be created to duplicate specified data objects at the edge site 601. Other rules may be created to prevent temporary copies from being stored at the edge site or on the shuttle storage devices. As another example, a link cost between the shuttle storage devices 607, 608, 609 and an edge site 601 may be set to a low value, so that the gateway nodes 605, 606 at the edge site 601 will preferentially communicate with the shuttle storage devices 607, 608, 609. A link cost value indicates the cost associated with moving data from one location to another location. The concept of cost may reflect any of a number of variables, such as time, monetary expense, power consumption, or cost attributes, or a combination of any such attributes. After the information lifecycle management policy is updated, the shuttle storage devices are then brought online and ready for storage.

A digital data object 604 is first ingested into the distributed network at the source location through a gateway node 606. Ingestion of a digital data object may be performed as an automatic result of that digital data object being created or moved to a specified resource or file location. Alternatively, ingestion may occur on designated files, or files with certain attributes or locations after some other triggering event, such as the passage of a specified period of time or a storage device reaching a capacity level. As another example, ingestion may occur as a result of user input.

Information management policies may be configured so that the digital data object is automatically duplicated onto one or more shuttle storage devices 607, 608, 609. In this way, ingestion automatically results in the ingested digital data object being duplicated onto multiple shuttle storage devices that are in local communication at the source location.

In some embodiments, a digital data object may be ingested through a gateway node and duplicated onto a shuttle storage device 608 in local communication with the gateway node. For example, a shuttle storage device may be in local communication using any of a number of different network or bus protocols. Some examples of such networks or buses include Ethernet or wireless networks, SATA, ATA, Firewire, and Universal Serial Bus.

At some point, the shuttle storage device will be ready for migration to a new location. A shuttle storage device movement event may be triggered within the distributed storage system by one of a number of possible causes. For example, when a shuttle storage device reaches a specified capacity level, such as full capacity or near full capacity, a movement event can be triggered. A movement event may also be triggered when ingest is complete. As another example, a movement event may occur at a specified time interval. Alternatively, a movement event may be triggered manually by user action, such as action that might occur when an entire location is being shut down and all digital data objects therein must be migrated to a new location regardless of their capacity levels.

When the movement event is triggered, the information lifecycle management policies are updated to change the storage state of the shuttle storage device to read-only. The shuttle storage device is then taken off-line for transport to the new location. The information lifecycle management policies may again be updated to account for the off-line status of the shuttle storage device. The link cost between the shuttle storage devices 607, 608, 609 and an edge site 601 may be set to a high value, so that the gateway nodes 605, 606 at the edge site 601 will not communicate with the shuttle storage devices 607, 608, 609. The shuttle storage devices 607, 608, 609 may also be set to read-only.

Figure 3B:
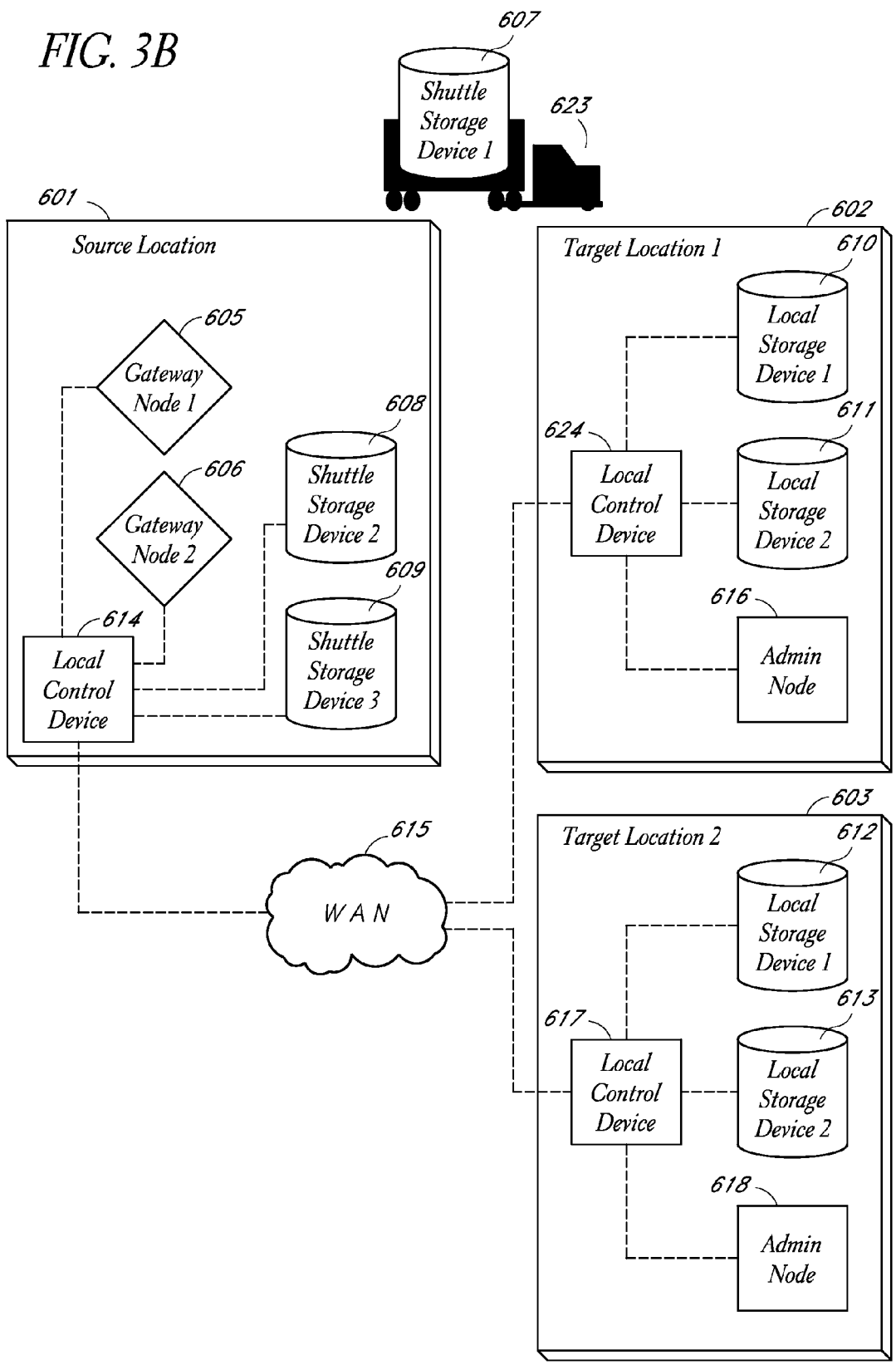

Different organizations are faced with various requirements and regulations concerning the availability and redundancy of their digital data objects. Transportation may occur in ways which account for an organization's particular requirements. For example, FIG. 3B illustrates transporting a shuttle storage device 607 to a target location 602. Grid provisioning information may be configured to register the shuttle storage device's status as being in transit while it is moved from the source location 601 to its target location 602. Depending on the type of transit, and the extent of records which are being kept, the grid provisioning information may also contain tracking information associated with the transportation of the shuttle storage device. For example, the shuttle storage device may be moved using a shipping, courier, or freight service which may provide a unique tracking number for the shuttle storage device. In that case, the tracking device may be registered in association with the shuttle storage device's status or location.

Figure 3C:
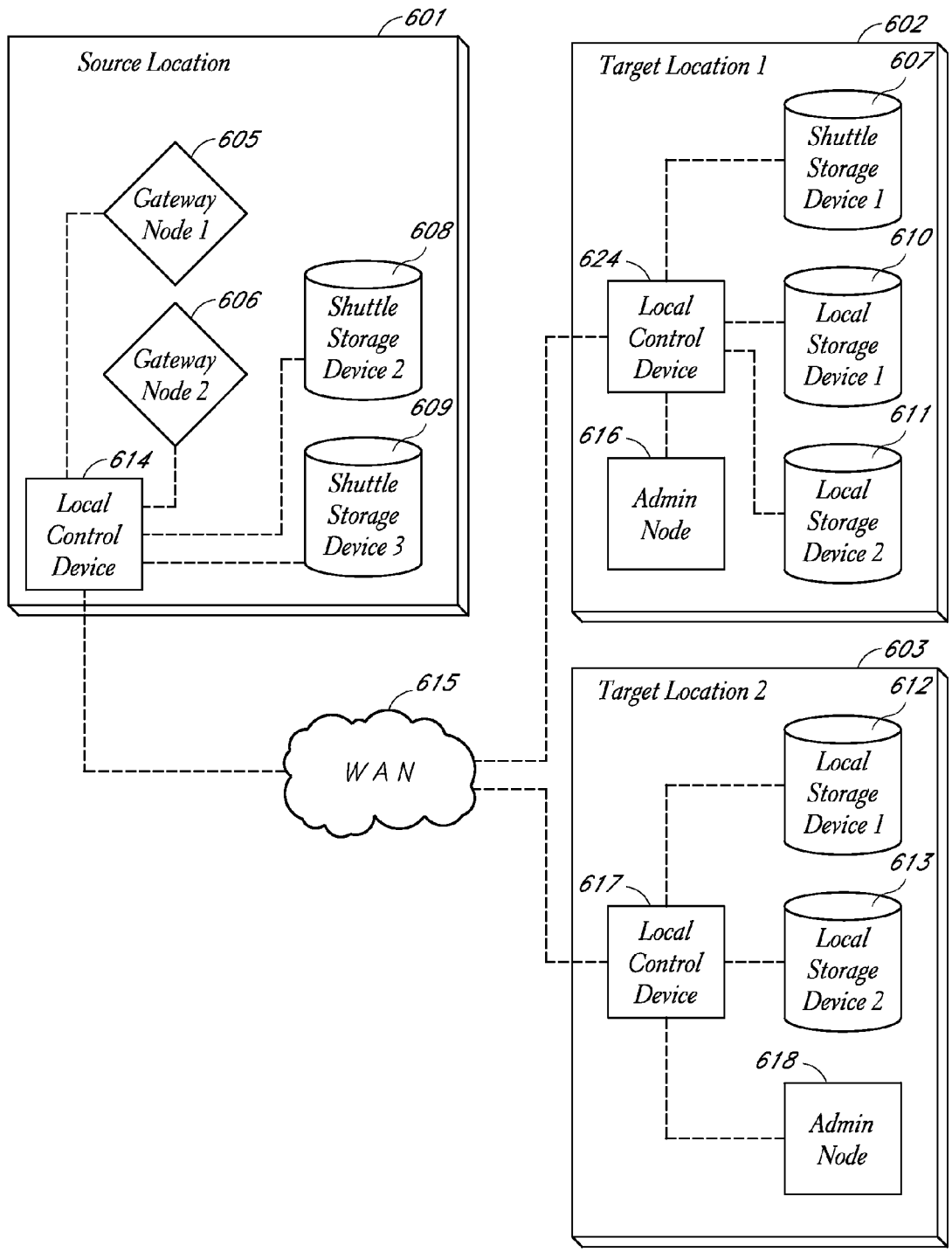

Once the shuttle storage device is placed in local communication with the target location as illustrated in FIG. 3C the grid provisioning information should be appropriately updated to reflect this status. For example, the IP address and group associated with shuttle storage device may need to be updated. In one embodiment, the shuttle storage device may be quarantined upon reaching the target location. This quarantining may involve restricting access to the shuttle storage device until certain conditions are met—such as requiring that the shuttle storage device have its contents verified before it may be removed from quarantine. In one embodiment, quarantining the shuttle storage device may involve storing it in a specific physical location in connection with quarantine-specific hardware. In another embodiment, the shuttle storage device may be quarantined by the control system restricting its own, and other objects' access to the contents of the shuttle storage device until the required conditions have been met. For example, a shuttle storage device may be quarantined through having its contents marked as being read only. Alternatively, a shuttle storage device may be quarantined through ensuring that no code stored on the shuttle storage device may be executed during the period of quarantine.

In one embodiment, such updating occurs automatically as a result of the shuttle storage device's local communication with the target location being sensed by electronic communications over the network or bus comprising the local communication medium at the target location. For example, in an embodiment where the shuttle storage node comprises a USB interface, the USB "plug and play" feature may trigger the shuttle storage device being registered with the control system as being in local communication with the target location. In another embodiment where the shuttle storage device comprises an Ethernet network interface, a service running on the shuttle storage device may transmit network communications once placed in local communication with the target location, such network communications triggering the shuttle storage device being registered with the control system as being in local communication with the target location.

Figure 3D:
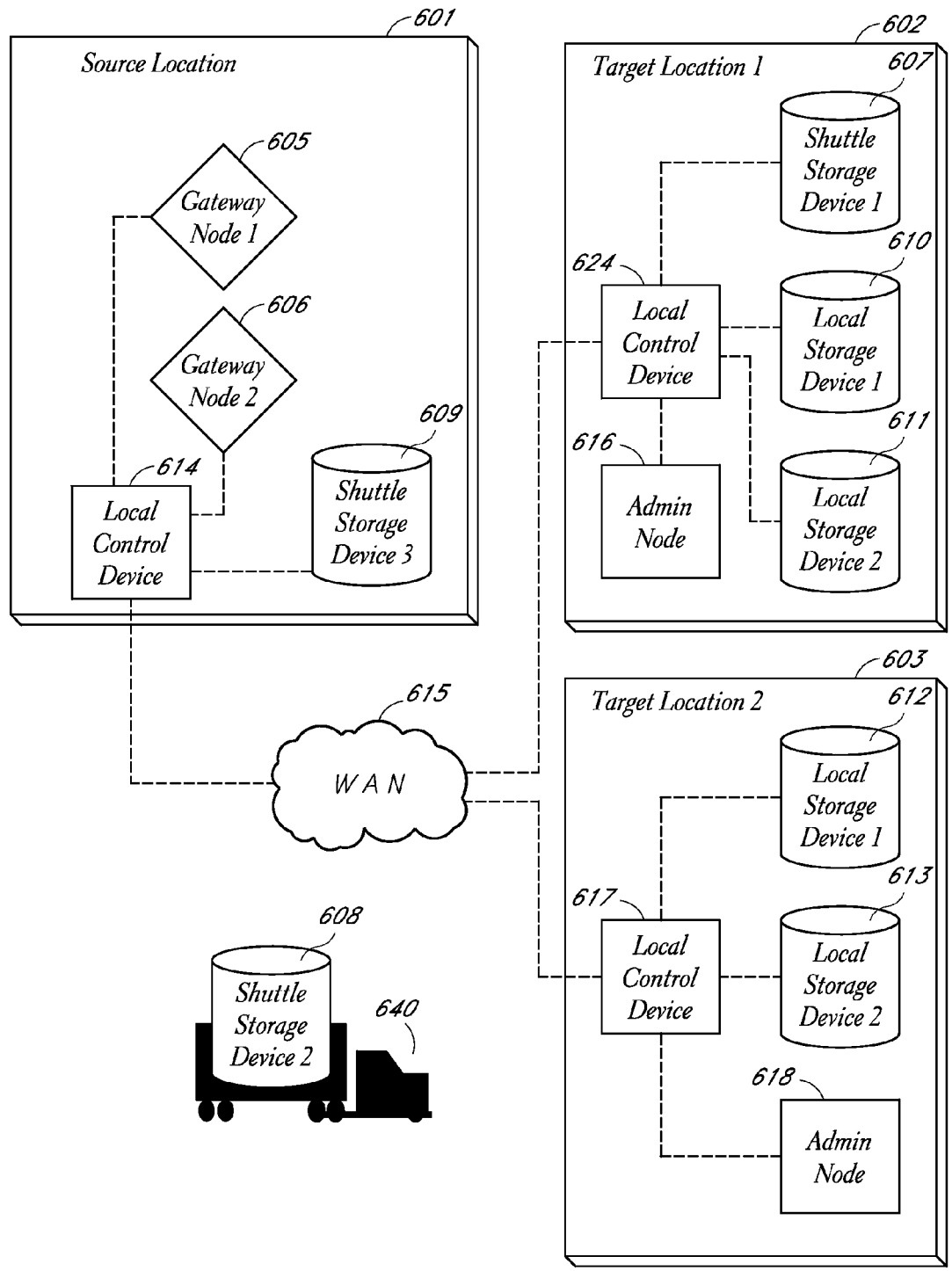
Figure 3E:
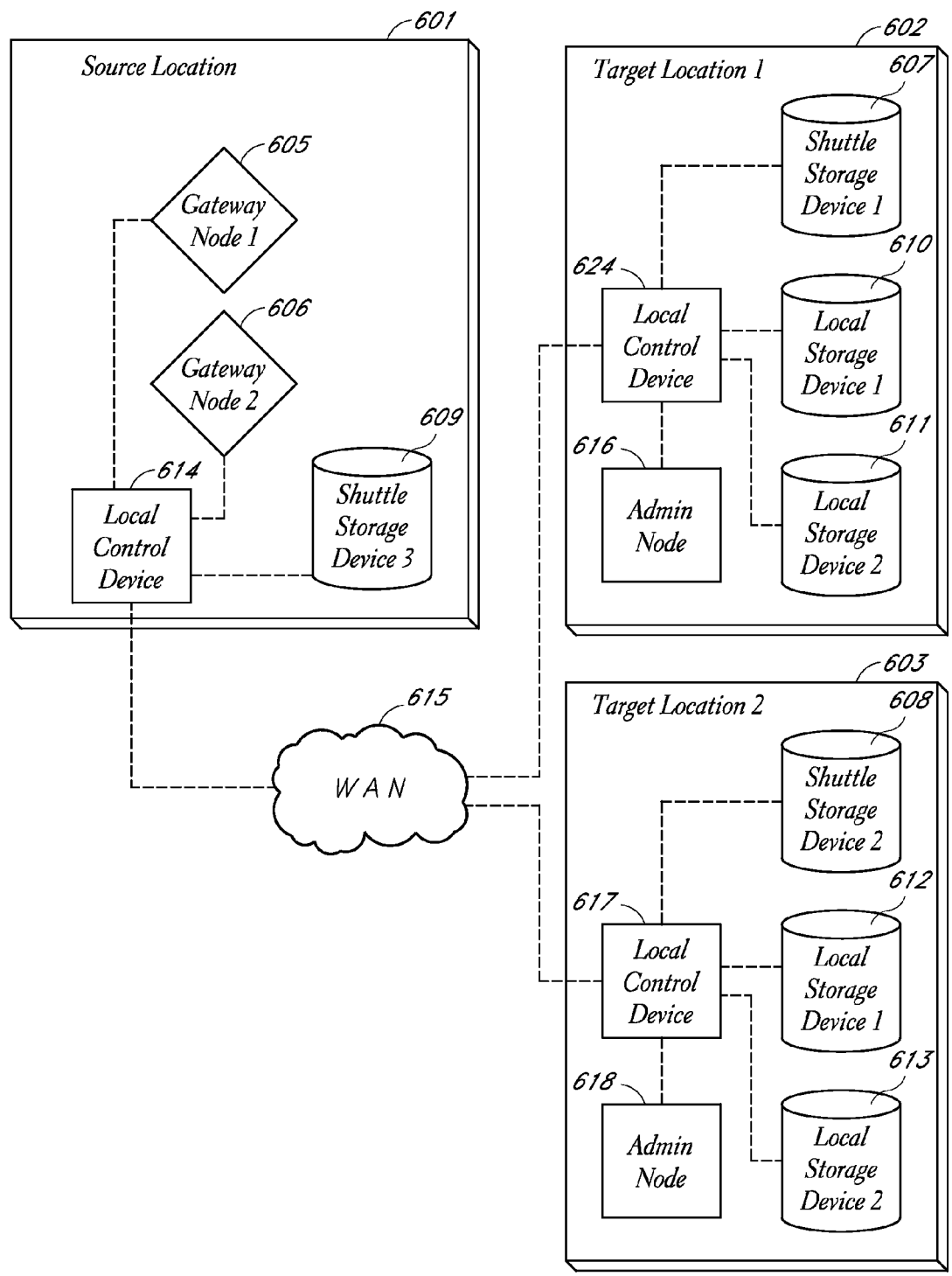

Organizations may improve data availability and fault recovery by moving duplicate data objects in series—for example, shuttle storage device 608 may be removed from local communication at the source location only after shuttle storage device 607 has been properly registered as being in local communication with target location 602. FIG. 3D illustrates that the shuttle storage device 608 may then be moved to target location 603. As illustrated by FIG. 3E, once shuttle storage device 608 is placed in local communication with target location 603 it may be properly registered with the control system as such.

Shuttle Storage Devices

A shuttle storage device is a shuttle node which may be physically transported. A number of factors, including data volume, access frequency, access sequence, performance demands, storage duration, availability, compatibility with existing hardware and storage market prices may affect the selection of shuttle storage devices. In one embodiment, a shuttle storage device is a magnetic spinning disk, such as those found within commercially available hard drives. In a related embodiment, the magnetic spinning disk may be encased in additional hardware which comprises a storage shelf for the magnetic spinning disk. In an embodiment where that hardware comprises electronic control and communication components, the shelf is said to be an active shelf. In an embodiment where the hardware comprises only non-electronic, non-communicating components, the shelf is said to be a passive shelf. A magnetic spinning disk may be connected to the distributed storage network by any appropriate bus, such as ATA, SATA, SCSI, SAS, or Fibre Channel. A magnetic spinning disk may also be connected using bridge circuitry and a bus such as IEEE 1394, USB, or Ethernet.

A shuttle storage device may contain magnetic tape, which may be contained and transported in a storage shelf, such as a cartridge passive storage shelf. The shuttle storage device may also contain tape-reading or cartridge-reading hardware which would provide some form of interconnect that provides access to the enclosed digital data store, resulting in an active storage shelf.

Similarly, optical discs, such as CD-R, CD-RW, DVD-R, DVD+R, DVD-RW, DVD+RW, Blue-Ray, HD-DVD, UMD, or other optical disk formats may be used as shuttle storage devices. Such shuttle storage devices may further include storage shelves, either passive or active, for such optical disks.

Furthermore, solid state storage devices may be used as shuttle storage devices. Solid state shuttle storage devices may connect to the distributed system through any number of buses, including traditional hard-drive buses, USB, or other buses.

A shuttle storage device may contain a combination of storage mediums. A shuttle storage device may also comprise additional elements other than data storage.

Duplication

Figure 4:
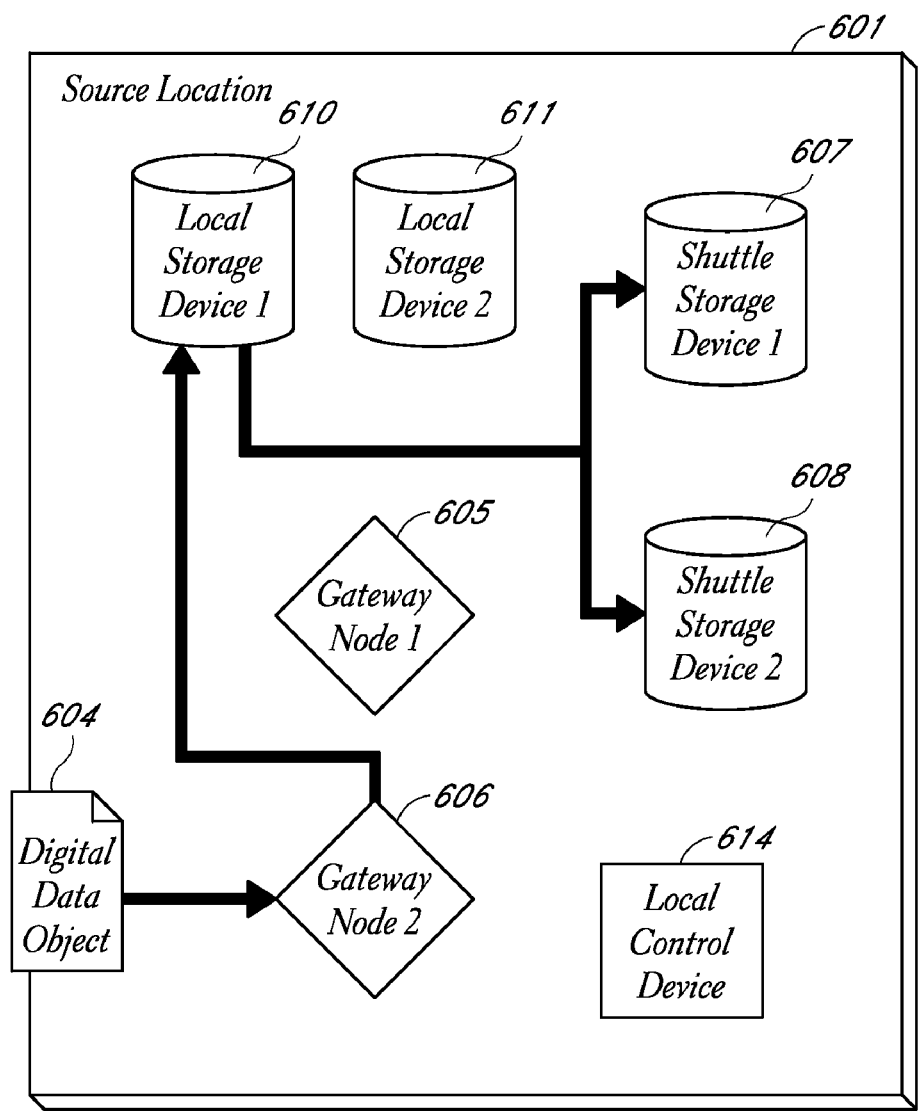
FIG. 4 illustrates another embodiment, in which digital data objects are first stored on one or more local storage devices and then duplicated to one or more shuttle storage devices.

Duplication of digital data objects to a shuttle storage device occurs once the shuttle storage device is placed in local communication with the source location. In one embodiment the source location infrastructure is configured such that gateway nodes, upon ingesting a digital data object, automatically duplicate that digital data object to one or more shuttle storage devices. Gateway nodes may perform this based on hardware or software configuration—for example, a RAID array may perform mirror-based duplication to multiple magnetic spinning disks, or a software service may perform a copy function of all digital data objects ingested through it. FIG. 4 illustrates another embodiment, in which digital data objects are first stored on one or more local storage devices 625, 626 and then duplicated to one or more shuttle storage devices 607, 608. The act of duplicating digital data objects from a local storage device to a shuttle storage device may occur as a result of information lifecycle management policies which specify that certain digital data objects should be stored at alternate physical locations. When the grid provisioning information is updated to identify the shuttle storage device as being in local communication with the source location, duplication of digital data objects from the local storage device to the shuttle storage device may begin. Such an embodiment provides for a rule-driven rather than infrastructure-driven approach to duplicating digital data objects.

Figure 5:
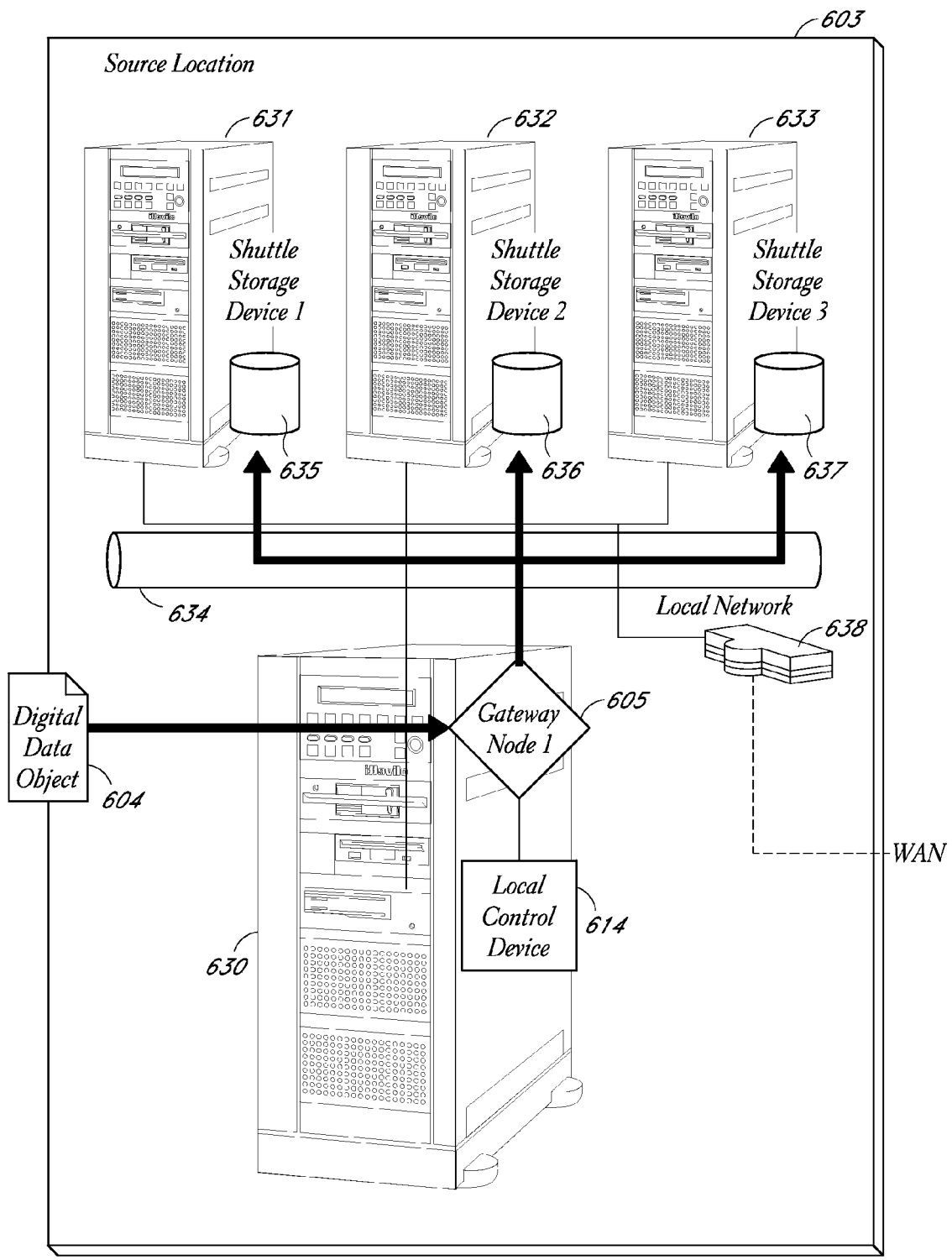
FIG. 5 illustrates an example in which shuttle storage devices comprising data storage elements are computer servers in connection with a local area network.

FIG. 5 illustrates an example in which shuttle storage devices 631, 632, 633 comprising data storage elements 635, 636, 637 are computer servers in connection with a local area network 634. In this example data objects are ingested through a gateway node 605 residing on a separate server 630, with that server also providing the local control device service 614. The server hosting the gateway node is in communication with the same local area network as the shuttle servers, allowing duplication to occur across that connection medium. In this example, a router device 638 is also in communication with the local area network, providing a communication channel with a wide area network which may be used to communicate with other locations.

During the migration process, duplication may require placing additional shuttle storage devices in local communication with a source location. In one embodiment, the migration system monitors the capacity of a shuttle storage device as it receives duplicate copies of digital data objects. Once the shuttle storage device reaches a specified capacity level, such as 80% of its maximum storage capacity, the system initiates some action related to additional shuttle storage devices. For example, the system may display a message on the computer screen of a user or administrator. Alternatively, the system may send an electronic message via e-mail or some other communication protocol in order to alert a user or administrator that the shuttle storage device has reached a certain capacity level, and that additional shuttle storage devices may need to be placed in local communication with the system in order to allow ongoing duplication of digital data objects.

When additional shuttle storage devices are used in response to earlier shuttle storage devices reaching a certain capacity level the migration may proceed with the transportation of the filled shuttle storage devices while other shuttle storage devices are still receiving digital data objects. In another embodiment, the transportation may be delayed until a group of shuttle storage devices have completed the duplication process.

In another embodiment, the control system considers other factors in addition to the current capacity of the shuttle storage device in determining whether and when to send a notification concerning capacity. For example, fill-rate, compression ratios, or estimated remaining data volume to be duplicated may be taken into account in making such a decision.

Data migration may use compression methods, such as intra or cross-object redundancy encodings. Such compression may allow for more cost efficient transportation by reducing the storage capacity necessary to transport a given amount of digital data objects. For example, the migration system may compress digital data objects as they are duplicated to a shuttle storage device. The digital data objects may then be transported in a compressed form. In a related embodiment, these objects are decompressed at the target location. Alternatively, the objects may remain compressed once at the target location.

The control system maintains information concerning a number of different object types, which may include identifiers for digital data objects. For example, as part of the migration process, the status or location of some or all digital data objects may be registered with the control system.

Figure 6:
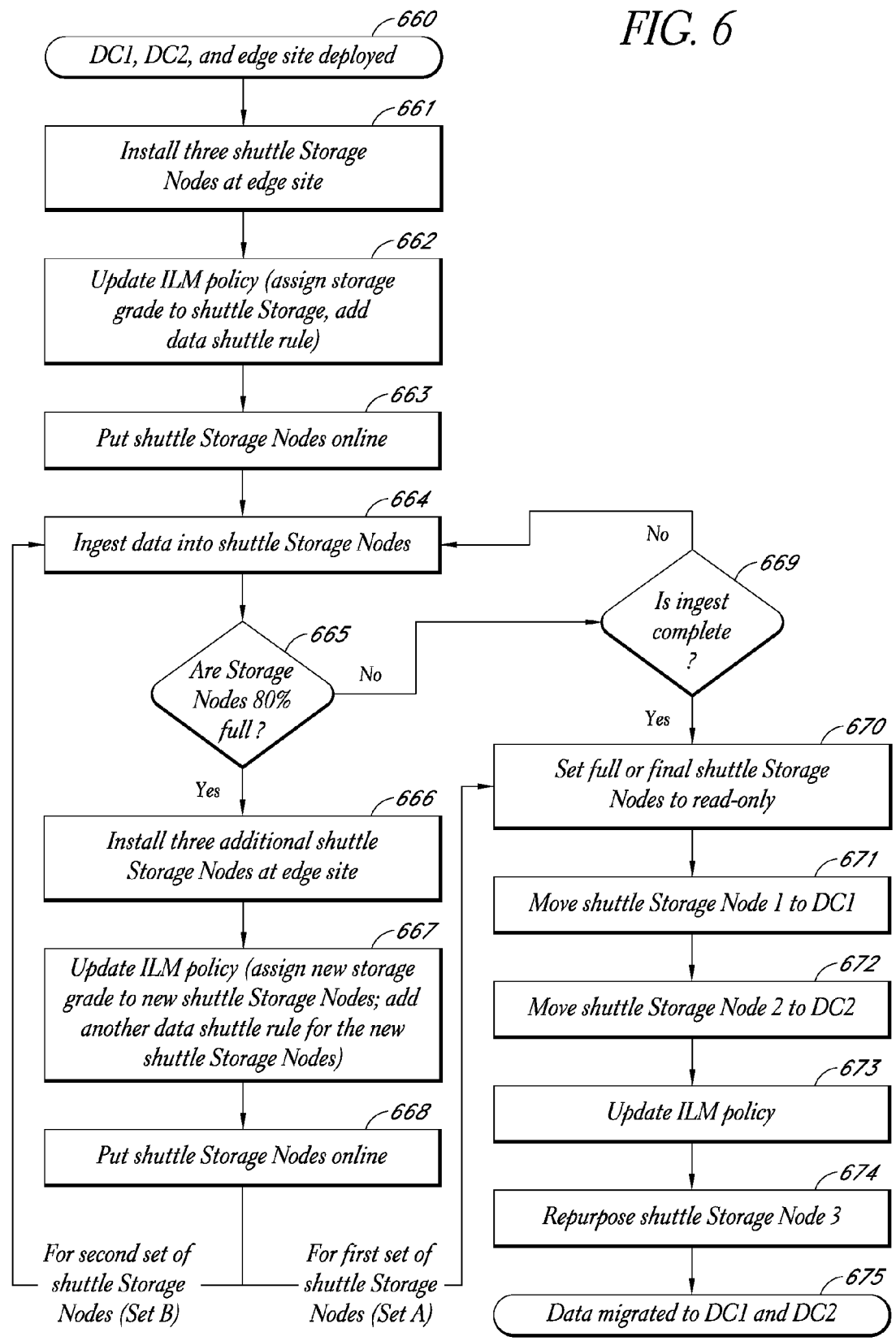
FIG. 6 illustrates a flow chart representation of a migration process from an edge site source location to two data center target locations, DC1 and DC2.

FIG. 6 illustrates a flow-chart representation of one embodiment of data migration using data storage shuttles. In this embodiment, the source location is described as an edge site, and digital data objects are to be migrated from the edge site to two different data centers, DC1 and DC2. The process begins by deploying the datacenters and the edge site 660. Next, three shuttle nodes are installed at the edge site 661. Installing these shuttle nodes may place them in local communication with the edge site. The information lifecycle management policy is updated to utilize the shuttle nodes. In this example, values in the information lifecycle management policy include storage grades for shuttle nodes. Storage grades may reflect attributes of a particular shuttle node which may be used in evaluating which shuttle nodes are best suited for a particular migration. Data shuttle rules are added which may specify, for example, that certain data objects should be stored at multiple, distinct, physical locations. The storage nodes are then put online. This ensures that the shuttle nodes are functioning within the digital distribution system and the control system recognizes them are ready to receive digital data objects. The shuttle storage nodes being placed online may trigger the ingesting of data into the shuttle storage nodes.

In this embodiment, the capacity of the shuttle storage nodes are monitored. If the shuttle storage nodes are 80% full, the flow chart instructs to install three additional shuttle storage nodes at the edge site. Three additional shuttle storage nodes are used because three initial shuttle storage nodes were used. This provides a new shuttle storage node to take the place of each of the initial set once they become full. The new shuttle storage nodes are placed online and they begin having digital data objects ingested into them. For shuttle storage nodes which are full, or for the partially-full shuttle storage nodes once ingestion is complete, the flow chart instructs to set such nodes to read-only. Next, the Shuttle Node 1 is moved to its target location, DC1 670. Shuttle Node 2 is moved to its target location DC2. The ILM policy is updated to reflect that the shuttle nodes are in local communication with their respective target locations. In this embodiment, the third shuttle storage node, still located at the edge site, is now repurposed. Repurposing a shuttle storage node may comprise deleting all digital data objects from it. Repurposing may also comprise using the shuttle storage node for a new role in a different act of migration. Repurposing may cause a content reevaluation. During a content reevaluation, the system may compare objects' actual locations to their desired locations and may take corrective action if appropriate. The flow chart concludes by noting that the data has been migrated to the target locations DC1 and DC2.

Verification

Migrating data objects in a distributed storage system may involve the verification of migrated digital data objects. Similarly, systems for migration of digital data objects in a distributed storage system may contain components related to verification of migrated digital data objects. Verification object metadata may be generated and associated with digital data objects. Such verification object metadata may be registered with the control system.

The high-level overview illustrated in the figures partitions the functionality of the overall system into modules for ease of explanation. It is to be understood, however, that one or more modules may operate as a single unit. Conversely, a single module may comprise one or more subcomponents that are distributed throughout one or more locations. Further, the communication between the modules may occur in a variety of ways, such as hardware implementations, software implementation, or a combination of hardware and software. Further, the modules may be realized using state machines, microcode, microprocessors, digital signal processors, or any other appropriate digital or analog technology.

It should be understood that the methods and systems described herein may be implemented in a variety of ways. Methods described herein may utilize other steps or omit certain steps. Other embodiments that are apparent to those of ordinary skill in the art, including embodiments which do not provide all of the benefits and features set forth herein, are also within the scope of the invention. While some of the embodiments described herein provide specific details for implementation, the scope of the disclosure is intended to be broad and not limited to the specific embodiments described. Accordingly, details described in the specification should not be construed as limitations of the claimed invention. Rather, the scope of the claims should be ascertained from the language of the claims, which use terms consistent with their plain and ordinary meaning.

The invention claimed is:

1. A method for physically moving digital data objects from a source location to at least one target location in a distributed storage system, wherein the digital data objects are stored in accordance with information lifecycle management policies, the method comprising:
   registering, with a storage grid control system that maintains data object lifecycle management information and storage node information in a distributed storage network, that at least one shuttle storage device is in local communication at a source location;
   duplicating, onto the at least one shuttle storage device, digital data objects in accordance with data object lifecycle management information associated with the digital data objects;
   registering, with the storage grid control system, the presence of the digital data objects duplicated onto the at least one shuttle storage device, wherein registering comprises obtaining verification object metadata that allows validation of the integrity of the digital data objects duplicated onto the at least one shuttle storage device;
   physically moving the at least one shuttle storage device from the source location to a target location; and
   registering, with the storage grid control system, that the at least one shuttle storage device is in local communication at the target location.

2. The method of claim 1 wherein:
   registering, with the storage grid control system, that at least one shuttle storage device is in local communication at the source location comprises registering at least three shuttle storage devices in local communication at the source location;
   duplicating, onto the at least one shuttle storage device, the digital data objects specified in the information lifecycle management policies comprises duplicating onto the at least three shuttle storage devices the digital data objects specified in the information lifecycle management policies;
   physically moving the at least one shuttle storage device from the source location to a target location comprises physically moving a first of the at least three shuttle storage devices to a first target location and physically moving a second of the at least three shuttle storage devices to a second target location; and
   registering, with the storage grid control system, that the at least one shuttle storage device is in local communication at the target location comprises registering with the storage grid control system that the first of the at least three shuttle storage devices is in local communication at the first target location and registering with the storage grid control system that the second of the at least three shuttle storage devices is in local communication at the second target location.

3. The method of claim 1 further comprising verifying object metadata registered with the storage grid control system prior to physically moving the at least one shuttle storage device from the source location to a target location.

4. The method of claim 1 where digital data objects are encrypted before the shuttle storage device onto which they were duplicated is physically moved.

5. The method of claim 4 where the storage grid control system stores encryption keys as object metadata associated with the encrypted digital data objects.

6. The method of claim 1 where digital data objects are compressed before the shuttle storage device onto which they were duplicated is physically moved.

7. The method of claim 1 further comprising verifying, after duplicating a digital data object to a shuttle storage device, the integrity of the content of the digital data object prior to physically moving the shuttle storage device onto which the digital data object was duplicated.

8. The method of claim 1 further comprising verifying, after physically moving a shuttle storage device to the target location, the integrity of the content of the digital data objects on that shuttle storage device.

9. The method of claim 8 further comprising quarantining the shuttle storage device until after verification of the digital data objects on the shuttle storage device, where quarantining the shuttle storage device comprises restricting access to the shuttle storage device.

10. The method of claim 8 further comprising deleting digital data objects from the source location once the corresponding digital data objects have been verified to be received at the target location.

11. The method of claim 1 further comprising verifying that all of the digital data objects that were duplicated from the source location still exist on the shuttle storage device after it arrives at the target location.

12. The method of claim 11 further comprising verifying that no additional digital data objects exist on the shuttle storage device after it arrives at the target location.

13. The method of claim 12 further comprising quarantining the shuttle storage device until after verification that no additional digital data objects exist on the shuttle storage device, where quarantining the shuttle storage device comprises restricting access to the shuttle storage device.

14. The method of claim 1 wherein the digital data objects being physically moved from the source location remain accessible throughout the distributed storage system while the shuttle storage device is being physically moved.

15. The method of claim 1 further comprising generating an audit trail corresponding to the digital data objects.

16. The method of claim 15 wherein the audit trail includes governance information for the digital data objects.

17. The method of claim 15 wherein the audit trail includes chain of custody information for the digital data objects.

18. The method of claim 1 wherein the method is initiated by human action.

19. The method of claim 1 wherein the method is initiated automatically.

20. The method of claim 19 wherein the automatic initiation of the method occurs based upon time considerations.

21. The method of claim 19 wherein the automatic initiation of the method occurs based upon storage capacity considerations.

22. The method of claim 19 wherein the automatic initiation of the method occurs based upon the connection of a shuttle storage device to the source location.

23. The method of claim 1 further comprising duplicating the digital data objects on the shuttle storage device to a local storage device when the shuttle storage device arrives at the target location.

24. The method of claim 23 further comprising deleting the digital data objects from the shuttle storage device after duplicating the digital data objects on the shuttle storage device to the local storage device.

25. The method of claim 1 further comprising displaying, to a user, a visual representation of the information storage management policies and attributes of the shuttle storage device.

26. The method of claim 1 further comprising transmitting one or more notifications intended for a human recipient which contain information relevant to the status of a shuttle storage device.

27. The method of claim 1 wherein the at least one shuttle storage device comprises a magnetic spinning disk, magnetic tape, optical disc, solid state storage device or other digital storage device.

28. The method of claim 1 wherein the at least one shuttle storage device comprises a digital storage device enclosed in a passive physical storage shelf.

29. The method of claim 1 wherein the at least one shuttle storage device comprises a digital storage device enclosed in an active physical storage shelf comprising an electrical, optical or wireless interconnect that provides access to the enclosed digital storage devices when connected to the distributed storage system.

30. The method of claim 29 wherein the shuttle storage device further comprises a processing element, and a local memory element.

31. A distributed storage system configured for physically moving digital data objects from a source location to at least one target location in a distributed storage system, wherein the digital data objects are stored in accordance with information lifecycle management policies, the distributed storage system comprising:
one or more computer processors; and
at least one non-transitory computer-readable storage medium having stored thereon a plurality of instructions configured to cause the one or more computer processors to perform operations comprising:
registering, with a storage grid control system that maintains data object lifecycle management information and storage node information in a distributed storage network, that at least one shuttle storage device is in local communication at a source location;
duplicating, onto the at least one shuttle storage device, digital data objects in accordance with data object lifecycle management information associated with the digital data objects;
registering, with the storage grid control system, the presence of the digital data objects duplicated onto the at least one shuttle storage device, wherein registering comprises obtaining verification object metadata that allows validation of the integrity of the digital data objects duplicated onto the at least one shuttle storage device;
wherein the at least one shuttle storage device is configured to be physically moved from the source location to a target location; and
registering, with the storage grid control system, that the at least one shuttle storage device is in local communication at the target location.

* * * * *